US009195315B2

(12) United States Patent
Golding et al.

(10) Patent No.: US 9,195,315 B2
(45) Date of Patent: Nov. 24, 2015

(54) INTERACTIVE CONTROL DEVICE AND SYSTEM INCLUDING AN INTEGRATED DISPLAY

(71) Applicant: Xerox Corporation, Norwalk, CT (US)

(72) Inventors: Michael Peter Golding, Ware (GB); Michael John Wilsher, Letchworth (GB)

(73) Assignee: Xerox Corporation, Norwalk, CT (US)

( * ) Notice: Subject to any disclaimer, the term of this patent is extended or adjusted under 35 U.S.C. 154(b) by 160 days.

(21) Appl. No.: 13/826,234

(22) Filed: Mar. 14, 2013

(65) Prior Publication Data

US 2014/0267194 A1    Sep. 18, 2014

(51) Int. Cl.
G06F 3/02    (2006.01)

(52) U.S. Cl.
CPC .... *G06F 3/0227* (2013.01); *G06F 2203/04804* (2013.01)

(58) Field of Classification Search
CPC .............. G06F 3/02; G06F 3/0312; G06F 2203/04804; G06F 3/0227
USPC ............... 345/156, 184; 200/316, 317
See application file for complete search history.

(56) References Cited

U.S. PATENT DOCUMENTS

| | | | |
|---|---|---|---|
| 6,876,313 B2 * | 4/2005 | Hsiung et al. | 341/35 |
| 7,489,303 B1 * | 2/2009 | Pryor | 345/173 |
| 7,671,851 B1 * | 3/2010 | Pryor | 345/184 |
| 8,462,022 B2 * | 6/2013 | Roth | 341/33 |
| 2004/0193016 A1 | 9/2004 | Root et al. | |
| 2009/0306795 A1 | 12/2009 | Robinson | |
| 2010/0231527 A1 * | 9/2010 | Fibaek | 345/173 |
| 2011/0034773 A1 | 2/2011 | Ishigami et al. | |

* cited by examiner

*Primary Examiner* — Ilana Spar
(74) *Attorney, Agent, or Firm* — Fay Sharpe LLP (57) ABSTRACT

Provided is an interactive control device and system including an integrated display. According to one exemplary embodiment, the control device includes a collimated optical fiber optically coupled to a conventional LCD screen including a control image, the control image is projected to a remote face of the optical fiber for viewing by a user. In addition, a tactile control integrated with the collimated optical fiber provided the user with the ability to control a function associated with the control image, whereby the control image dynamically changes based on the user's movement of the tactile control.

18 Claims, 6 Drawing Sheets

FIG. 8

INTERACTIVE CONTROL DEVICE AND SYSTEM INCLUDING AN INTEGRATED DISPLAY

BACKGROUND

Hardware control mechanisms, including but not limited to control knobs and control buttons, are routinely used as input mechanisms for providing input data to different types of systems and to enable user interaction with systems. Moving hardware controls typically provide valuable tactile feedback to a user of the system. When a user wishes to provide an input to a system, the user typically manipulates the position of the associated hardware control mechanism to provide a desired input to the system. For example, a user may rotate a control knob to provide a desire input. In another example, a hardware control mechanism may include a plurality of slider controls where each individual slider control is associated with a different input and a user selectively slides the control of a respective slider control to provide input data to the system.

As system complexities and capabilities increase, mechanisms for providing complex visual feedback at or near the control mechanism may be desirable. Examples of such visual feedback mechanisms include, but are not limited to, task icons, mode dependent menus or level controls and animated graphic schematics of the system operation affected by the control mechanism.

BRIEF DESCRIPTION

In one embodiment of this disclosure, described is an interactive control device including an integrated display comprising a light guide including a first end surface, a second end surface, and a middle section optically coupling the first and second end surface, the light guide configured to project on the second end surface a control image associated with a display screen optically coupled to the first end surface; and a tactile control operatively connected to the light guide, the tactile control configured to accept a user movement of a movable part associated with the tactile control, and communicate to the display screen the user movement of the movable part associated with the tactile control, wherein the control image associated with the display screen and displayed on the second end surface dynamically changes based on the user movement of the movable part associated with the tactile control.

In another embodiment of this disclosure, described is an interactive control system comprising a display system configured to display a control image associated with the control of a device, system or process; a controller operatively connected to the display system; and an interactive control device operatively connected to the display system, the interactive control device comprising a light guide including a first end surface proximate to the display system, a second end surface and a middle section optically coupling the first and second end surfaces, the light guide configured to project on the second end surface the control image associated with the control of the device, system or process; a tactile control operatively connected to the light guide, the tactile control configured to accept a user movement of a movable part associated with the tactile control, and communicate to one of the display system and controller the user movement of the movable part associated with the tactile control, wherein the control image associated with the display screen and dis-played on the second end surface dynamically changes based on the user movement of the movable part associated with the tactile control.

In still another embodiment of this disclosure, described is an interactive control system comprising a display system configured to display a plurality of control images associated with the control of a plurality of respective devices, systems or processes; a controller operatively connected to the display system; a plurality of control devices operatively connected to the display system, each interactive control device comprising a light guide including a first end surface proximate to the display system, a second end surface and a middle section optically coupling the first and second end surfaces, the light guide configured to project on the second end surface the control image associated with the control of the device, system or process; a tactile control operatively connected to the light guide, the tactile control configured to accept a user movement of the movable part associated with the tactile control, and communicate to one of the display system and controller the user movement of the movable part associated with the tactile control, wherein the control image associated with the display screen and displayed on the second end surface dynamically changes based on the user movement of the movable part associated with the tactile control; and a console configured to remotely locate the plurality of control devices, relative to the display system, wherein the second ends of the control devices are mounted to the console in two or more surface planes associated with the console.

DETAILED DESCRIPTION

This disclosure provides the combination of a physical control, such as a knob, dial etc., with a visual readout of variable/dynamic information associated with the control itself. One exemplary embodiment includes a dial made of a collimated optical fiber material affixed to a LCD display using a mounting configuration that senses changes in the dial setting so that the view on the LCD screen and thus displayed on the dial's flat viewing surface, changes dynamically. More broadly, the knob/dial optically transmits the display from a display screen or may include an integrated display screen.

Some potential advantages of the disclosure control apparatus and system include 1) better tactile feedback in a control requiring rotation or other motion compared to, say, a finger on a touch screen making that same motion. 2) Allows for a more dense display—a knob positioned on top of an LCD display may take up a smaller footprint than, say, a LCD display with a knob to the side of it. 3) Allows for some desirable and unique control aesthetics and ergonomics, making it a product differentiator.

Current user displays tend to be flat LCD panels with touch screens, or dedicated knobs and buttons with fixed logos. This disclosure provides the combination of a collimated optical fibre and an LCD display to bring interactive controls to a user with dynamic changing images and tactile controls. This allows tactile feedback from a physical control, without the need for the user to visually monitor his interaction with a touch screen, allowing concentration on a primary task, like flying a plane or driving, thereby providing enhanced safety when operating controls.

Figure 1:
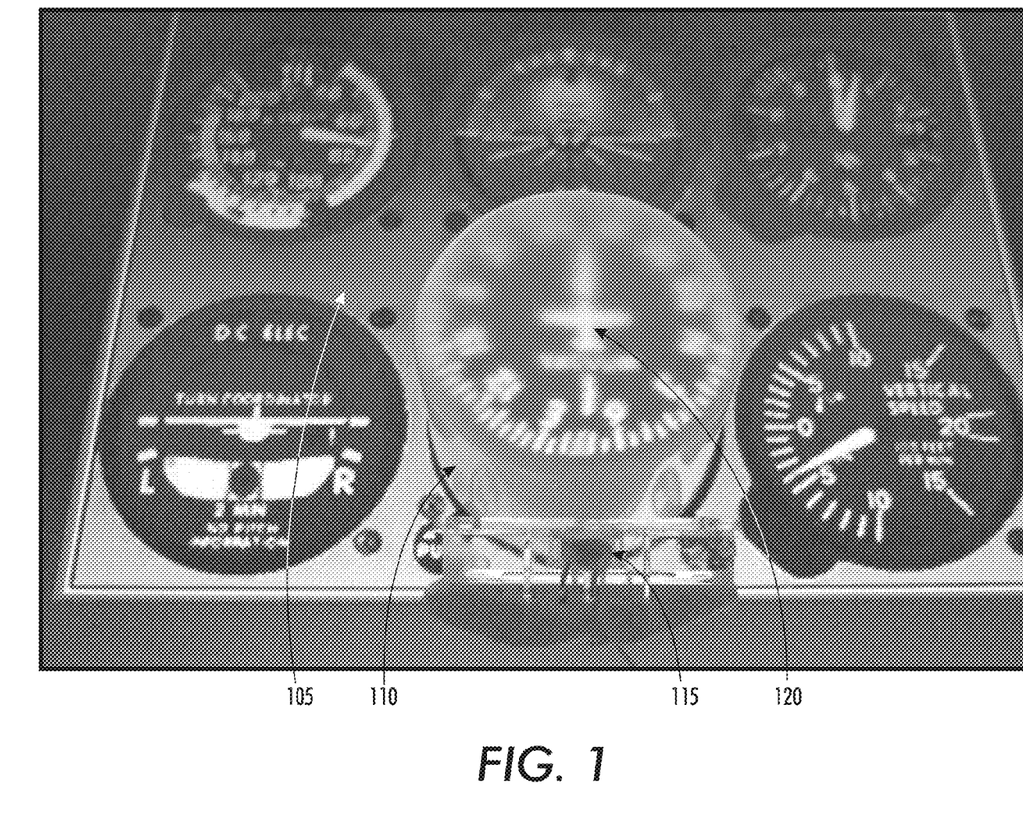
FIG. 1 illustrates an interactive control device and conventional LCD display according to an exemplary embodiment of this disclosure.

One disclosed embodiment includes the application of extruded collimated fibre light guides to extend a display surface away from a conventional LCD screen, thereby retaining the interactive display but allowing the user to interact with the physical light guide. For example, as illustrated in FIG. 1, the user can rotate the control, which is detected by an optical mouse sensor, and see the image visible on top of the control dynamically change based on the user's movement of the control.

Provided is a tactile knob or control with integrated display capability where the control itself interactively displays information such as the function of the control or what its setting is, whereby the display dynamically changes when the user manipulates the control.

One example of an implementation is described in detail below and includes a flat panel screen, such as an LCD, with a control mounted over it, where the control optically transmits the image from the screen to the control's display surface. The mode of transmission can be through a clear material, collimated optical fiber, fiber optic "gooseneck", etc., for example. Also, the control footprint can be smaller than the LCD screen, where a single screen may support multiple controls or it can be dedicated to a single control completely utilizing the display.

Another exemplary embodiment includes the control containing a display inside the control, such as an LCD embedded display, requiring potentially complex electrical connections. The control/display module may be panel mounted or stand-alone similar to a wireless mouse including a power source and wireless capability.

As previously discussed, the disclosed control apparatus and system do not require an operator of the control to keep an eye on an LCD. The operator can touch and rotate/move the control, eyes free and glance at the display for confirmation.

Another advantage of the disclosed embodiment is that tactile and visual feedback are in the same place. In addition, a control function can be dynamically assigned a function using the display, so one control area can be re-assigned dependent on the context.

Figure 2:
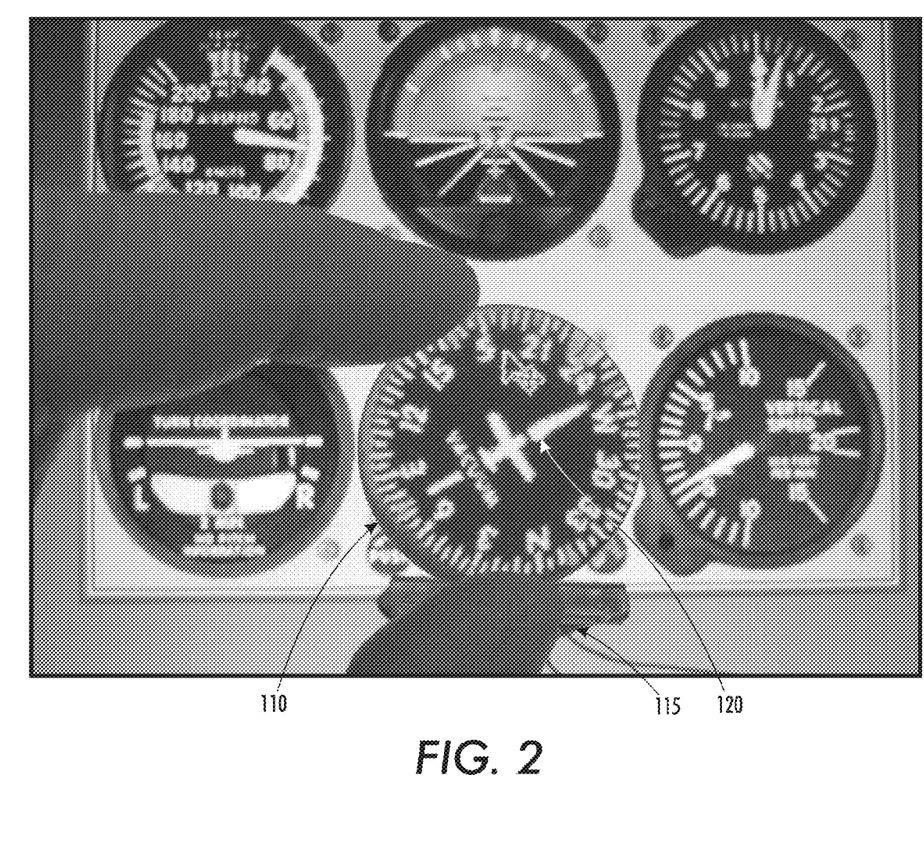
FIG. 2 illustrates the interactive control device of FIG. 1 rotated according to an exemplary embodiment of this disclosure.

Potential applications of the disclosed control apparatus and systems include aircraft heading control, as shown in FIGS. 1 and 2, and car controls including entertainment system selection where the advantages of touch adjustment with an operator's eye on the sky/road make these applications particularly attractive.

Other potential applications include copy/printer lighter/darker control and hue/saturation/contrast controls.

On sub screens you can use the same control to adjust setting values.

Basically, anything you use to use a control for, as opposed to just a pointer, the control provides visual interactive display feedback.

One of the biggest issues with touchscreens is the need for hard buttons to meet State and Federal agencies' requirements for electronic and information technology to be accessible to people with disabilities and part of this is the ease of use of physical buttons over a touch screen.

The rigidity of the optical fibre can be solid ridged glass as shown in FIGS. 1 and 2, solid shaped glass or a flexible fibre similar to an endoscope for a flexible routing configuration.

FIG. 1 shows a conventional LCD display 105 with a circular collimated fibre optic light guide 110 on top of the display, showing the image being transmitted through the light guide 110 and being clearly visible on the top surface 120 of the light guide away from the LCD display surface.

As shown in FIG. 2, during operation, the optical light guide 110 is rotated by a user and the rotation is picked up via a motion sensor 115, such as an optical mouse sensor, and causes the image under the light guide to change 120.

Hence the user sees in this case the image on the top surface of the light guide rotate in response to his/her action.

FIGS. 1 and 2 show a simple version with a single control, but there can be multiple controls for one display.

Figure 3:
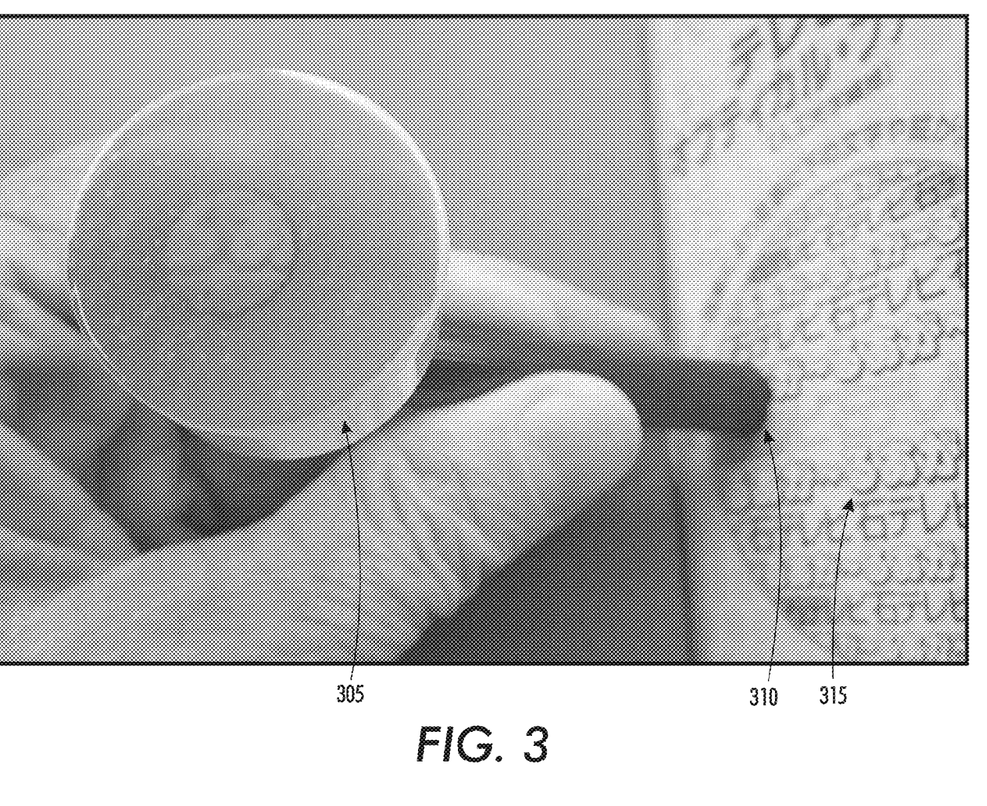
FIG. 3 illustrates an interactive control device applied to an LCD screen including concatenated control images according to an exemplary embodiment of this disclosure.

FIG. 3 illustrates the concatenation of an LCD screen 315. Light pipes 310 can be daisy chained to create fixed bent pipes and controls can be scattered around a single LCD display. The light pipe directs the image and control knob to a collimated optical fiber 305, allowing a single screen to provide an image source for multiple controls at different positions and orientations to the original screen.

It is to be understood that the shape of the moving element is not restricted to a round or rotational motion. For example, the moving element may be a slider control to provide linear motion.

Figure 4:
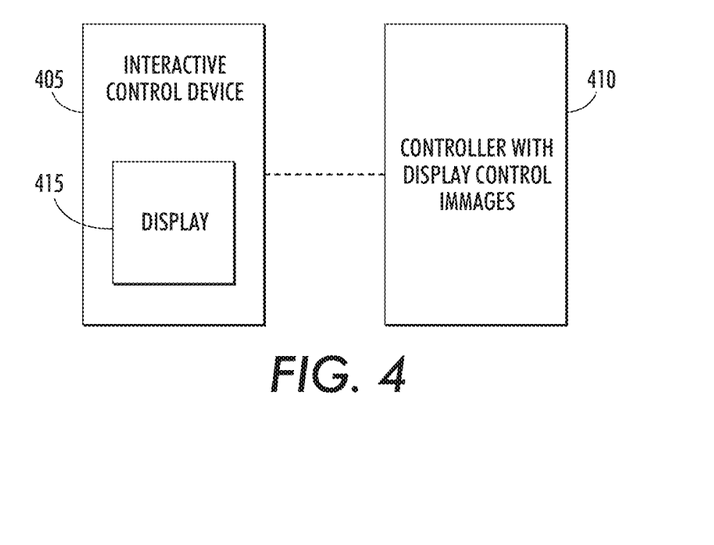
FIG. 4 is a block diagram representation of one embodiment of a control mechanism communicatively coupled to a controlled system.

Referring to FIG. 4, a block diagram representation of one embodiment of an interactive control device 405 communicatively coupled to a controller 410 is shown. The interactive control device 405 includes a display 415. In one embodiment, the interactive control device 405 is a separate device and can be optically/communicatively coupled to the controller 410. The interactive control device 405 operates as an input device to the controller 410 and is used to provide user provided input data to the controller 410. For example, a user providing input data to the controller 410 via the interactive control device 405.

The controller system 410 generates one or more images for display on the display 415 of the interactive control device 405. In one exemplary embodiment, the interactive control device 405 receives one or more initial control images from the controller 410 for the display on the control display device 415 upon initialization of the controller 410. Subsequently, the control device 405 receives a control image from the controller 410 for display on the control device display 415 where the image is generated by the controller 410 responsive to user input data received at the controller via the interactive control device 405.

According to one exemplary embodiment, the control images reflect the most recent input data received by the controller 410 via the interactive control device 405.

Figure 5:
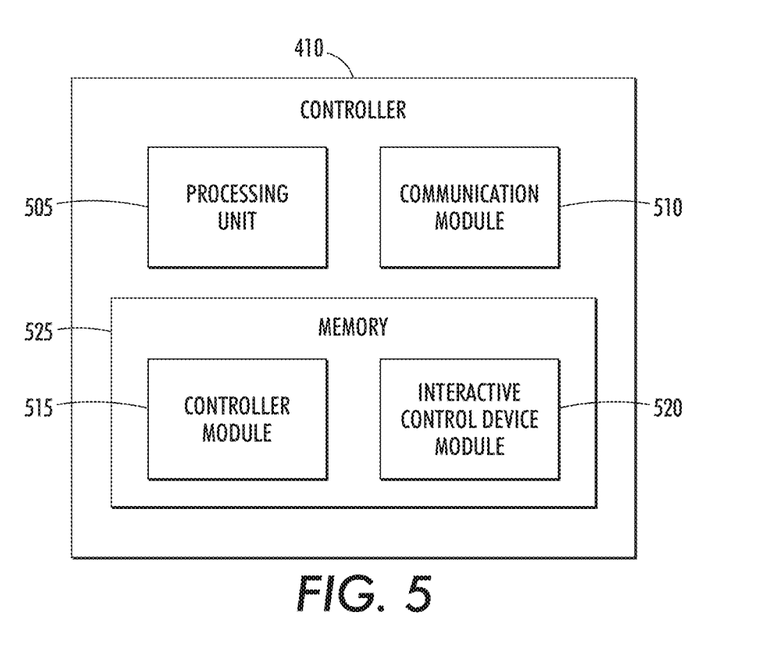
FIG. 5 is a block diagram representation of a controlled system that may be used with one embodiment of a control mechanism.

Referring to FIG. 5, a block diagram representation of a controller configured to be optically coupled to an interactive control device is shown. The controller 410 includes a processing unit 505 communicatively coupled to a communication module 510 and a memory 525. In one embodiment, a controller module 515 and an interactive control device module 520 is stored in the memory 525. The controller module 515 generally controls operation of the controller 410 and the interactive control device module 520 receives input data provided via the interactive control device 405 and provides the received input data to the controller module 515 for processing. In one embodiment, the interactive control device module 520 receives an image generation command from the controller module 515 and responsively generates one or more control images for display in the display area 415 of the interactive control device 405. While two different modules have been described, the memory 525 may include additional modules that facilitate the operation of the controller 410 and/or control mechanism 405.

The processing unit 505 generally includes a processor or controller. In one embodiment, the communication module 510 coordinates the exchange of data between the controller 410 and other systems. In one embodiment, the communication module 510 coordinates the exchange of data between the controller 410 and the interactive control device 405. Examples include wired communications and wireless communications.

The memory 525 includes one or more of a non-volatile memory, a volatile memory, and/or one or more storage devices. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, and flash memory devices. The processing unit 505 generally retrieves and executes machine readable instructions or software programs that are stored in the memory 525.

Figure 6:
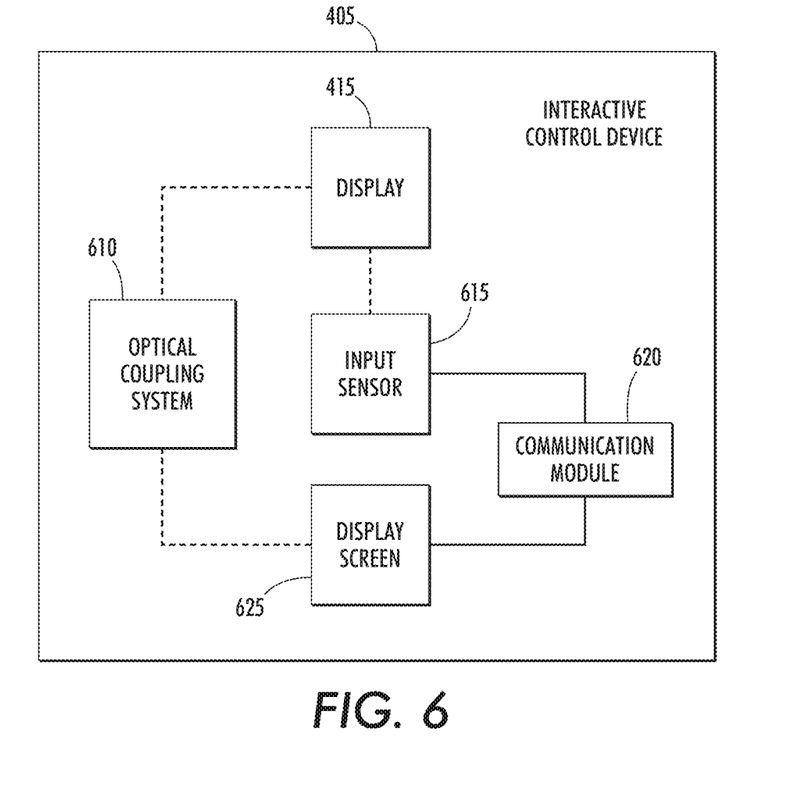
FIG. 6 is a block diagram representation of one embodiment of a control mechanism.

Referring to FIG. 6, one embodiment of an interactive control device 405 is shown. The interactive control device 405 includes an input sensor 615, a display screen 625, an optical coupling system 610 and a communication module 620. The interactive control device 405 includes a display 415. The input sensor 615 and the display 625 are operable to be communicatively coupled to the controller. In one embodiment the interactive control device 405 is communicatively coupled to the controller via the communication module 620. The communication module 620 enables the exchange of data between the interactive control device 405 and the controller 410. As previously discussed, the communication module 620 may be configured to provide wired communication.

The display screen 625 associated with the controller is an electroluminescent display screen. For example, the display screen 625 may be a light emitting diode (LED) screen or an organic light emitting diode (OLED) screen. While a number of different types of display screen 625 have been described, alternative types of display screens may also be used.

The input sensor 615 detects the movement of the interactive control device 405. According to one exemplary embodiment, the sensed movement is a sensed rate of movement of the optical light guide. The detected movement is transmitted to the controller system 410 for processing. The input sensor 615 may be, but is not limited to, a pressure sensor, an optical sensor, a magnetic sensor, or a position encoder.

The display 415 of the interactive control device includes an outer surface of the optical light guide. Notably, the display screen 625 may have a first shape and the interactive control device display 415 may have a second shape, where the first shape is different from the second shape. For example, the display screen 625 may have a generally rectangular shape while the interactive control device display 415 has a generally circular shape. In addition, the display screen 625 may be a first size and the interactive control device display 415 may be a second size, where the first size is different from the second size.

The optical coupling system 610 transmits one of a plurality of control images displayed on the display screen 625 to the interactive control device display.

In one embodiment, the display screen 625 displays one or more images on the display screen 625 in a display orientation. The optical coupling system 610 optically transmits a control image from the display screen 625 to the interactive control device display area 415 oriented consistent with the display screen.

In one embodiment, the optical coupling system 610 is a fiber optic system. In one embodiment, the optical coupling system 610 is a material composed of parallel packed optical fibers, i.e. collimated optical fibers. While a number of different types of optical coupling systems 610 have been described alternative types of optical coupling systems 610 may be used to transmit a control image displayed on an area of a display screen 625 to the interactive control device display 415.

In one embodiment, the light guide is manufactured using a fiber optic material and operates as the optical coupling system 610. At least a portion of the surface of the optical coupling system 610 operates as a display 415. The optical coupling system 610 is positioned adjacent to the display screen 625 such that at least a portion of an image displayed on the display screen 625 is piped to the interactive control device display 415. In one embodiment, one or more images are displayed on the display screen 625 in a first orientation and at least a portion of the one or more images is displayed in the interactive control device display 415 in a second orientation.

The optical coupling 610 is movable between one or more different positions. In one embodiment, the optical coupling is movable independent of and relative to the display screen 625. Each of the one or more different positions is associated with specific input data. For example, when a user wishes to provide selected input data to the controller 410 via the interactive control device 405, the user rotates the optical coupling, i.e. optical fiber, to a position associated with the selected input data.

An input sensor 615 senses the movement of the optical coupling 610 and communicates the sensed movement to the controller 410 via the communication module 620. In one embodiment, the sensed movement is a sensed rate of movement of the optical coupling. The controller 410 receives the movement detected by the input sensor 615 and determines whether the movement data is associated with specific input data and responsively generates an image generation command to generate one or more control images associated with the determined input data for display on the display screen 625.

In one embodiment, the controller 410 generates the one or more images responsive to the image generation command and transmits the generated one or more images to the display screen 625.

According to one exemplary embodiment, the control mechanism includes a knob shaped housing that surrounds an optical coupling system in the form of a cylindrical piece of stacked fiber optic material. The fiber optic material consists of a plurality of optical fibers stacked vertically in the direction of a rotation axis. The upper surface area of the interactive control device operates as a display.

The optical coupling system optically couples a portion of the display screen to the control device display.

A user provides desired input data to the controller by rotating the knob shaped optical light guide. The input sensor is a position encoder that operates to detect the movement of the knob shaped optical light guide. The detected movement data is transmitted to the controller 410. A control image generated by the controller 410 is displayed on the display screen. The optical coupling system pipes the portion of the displayed image within the circular area of the display screen for display on the interactive control device.

In one embodiment, the relative rotation of the knob shaped optical light guide with respect to a reference position defines the input data selected by a user. When the user wishes to provide desired input data, the user rotates the optical light guide from the reference position to a relative position associated with the desired input data. The input sensor 615 senses the relative movement of the knob 605 from the reference position to the relative position and the detected relative movement data is transmitted from the interactive control device 405 to the controller 410 for processing. In one embodiment, the input sensor detects a rate of rotational movement of the knob shaped light guide where the rate of rotational movement of the knob defines the input data entered by the user.

Figure 7:
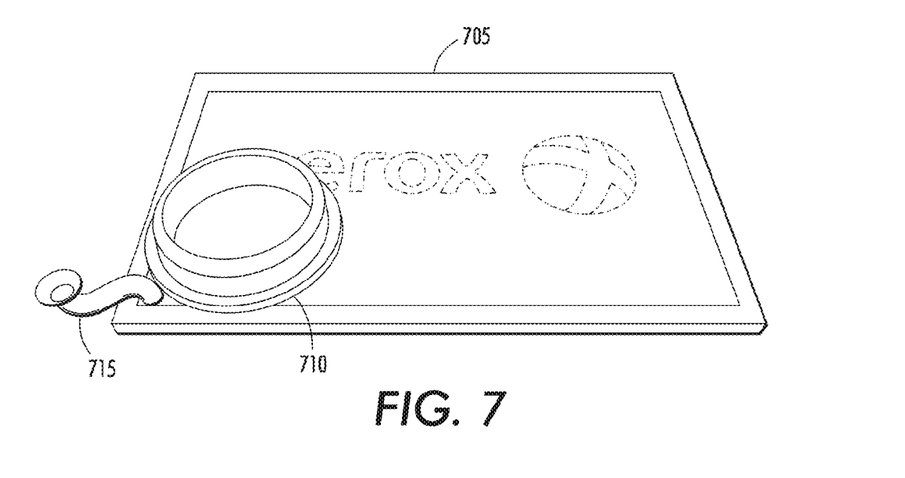
FIG. 7 is a perspective view of a rotary type interactive control device and a non-coaxial light pipe interactive control device according to exemplary embodiments of this disclosure.
Figure 8:
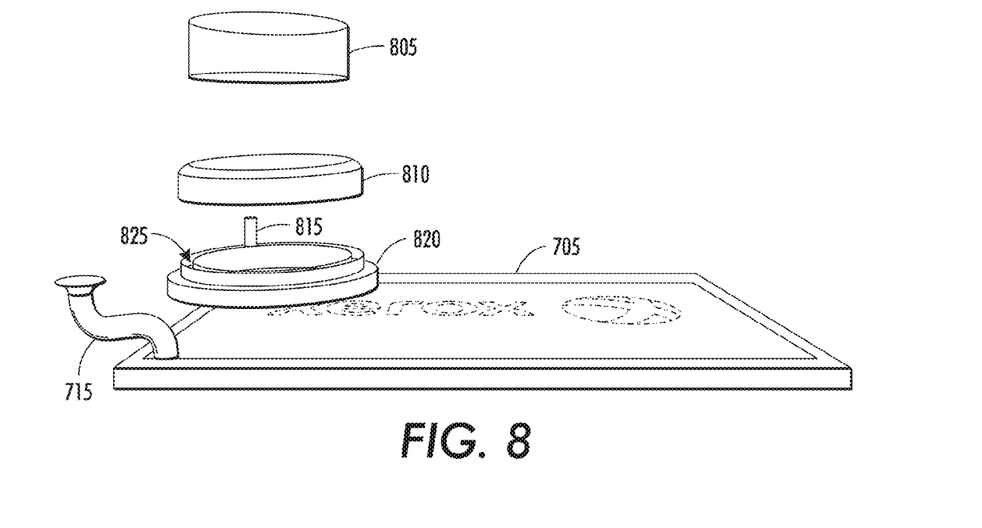
FIG. 8 is an exploded view of the rotary type interactive control device illustrated in FIG. 7.

With reference to FIGS. 7 and 8, described below is an exemplary embodiment of two interactive control devices according to this disclosure. As shown, a light pipe type control device 715 and a rotary type control device are optically coupled to a LCD display 705 which may be resistive or capacitive and operate generally as previously described.

More specifically, the rotary type interactive control device includes a base 820, a control ring 810, and a collimated fiber 805 which are operatively attached to each other, for example, by a clipping arrangement. The control ring 810 is made of a conductive type material, such as a conductive plastic or rubber, and is operatively associated with a relatively small conductive cylinder 815 which makes contact with the LCD screen 705. The collimated fiber 805 also contacts the LCD screen and passes through the control ring 810 when the unit is assembled.

In operation, the base is affixed to the LCD screen and a user rotates the conductive ring which moves the conductive cylindrical piece 815 along a channel 825 of the base 820. This movement of the conductive cylindrical piece 815 provides a conductive engagement with the LCD screen, thereby providing tactile control of a function. The collimated fiber 805, driven by the LCD screen, provides a dynamically changing image of the user movement associated with the movement of the control ring 810.

The interactive control device 710 is shown affixed to the LCD screen. This affixation may be accomplished with glue where the control base is made of a non-conductive material, such as plastic. Notably, the interactive control device may be affixable at a plurality of locations of the LCD screen where a peg type arrangement is used. In other words, a user is able to move the interactive control device 710 to multiple locations, a location selected depending on a desired control function.

Interactive control device 715 is a light pipe type device which also is affixed to the LCD screen 705. The light pipe control device includes collimated fibers which are optically coupled to the LCD screen at one end, and include a flared type display area at the other end. In addition, a conductive coating of the collimated fibers provides touch control of the LCD screen, by a user, by touching the flared end of the collimated fiber.

According to one exemplary embodiment, the light pipe is routed to a panel which is remotely located from the LCD display. In addition, the light pipe optically transmits an icon from the display to the flared end of the light pipe, the icon providing a viewer selection of a control image associated with the rotary type control device 710.

In one embodiment a computer readable medium 525 stores a computer executable program for displaying an image on an interactive control device 405 having an image display 415. The computer readable medium 525 includes computer readable code for receiving control device movement data from an input sensor 615 operable to detect movement of the interactive control device 605, the control device 405 having a display 415, computer readable code for determining the detected movement of the control device and computer readable code for generating an image for display on a display screen 625 based on the movement, wherein the control image is optically transmitted via an optical coupling system 925 from a first area of the display screen 625 for display on the display 415 of the interactive control device 605.

It should be noted that while systems implemented using software or firmware executed by hardware have been described above, those having ordinary skill in the art will readily recognize that the disclosed systems could be implemented exclusively in hardware through the use of one or more custom circuits, such as for example, application-specific integrated circuits (ASICs) or any other suitable combination of hardware and/or software.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. An interactive control device including an integrated display comprising:
a light guide including a first end surface, a second end surface, and a middle section optically coupling the first and second end surface and the light guide including an electrically conductive coating extending along a longitudinal axis of the light guide, the light guide configured to project on the second end surface a control image associated with an interactive touchscreen display optically coupled to the first end surface and electrically couple the light guide to the interactive touchscreen display; and
a tactile control operatively connected to the light guide, the tactile control configured to accept a user movement of a movable part associated with the tactile control, and provide an electrically conductive engagement of the light guide electrically conductive coating with the user movement of the movable part associated with the tactile control, the electrically conductive engagement operatively associated with movable touch control of the interactive touchscreen by the user movement of the movable part,
wherein the control image associated with the interactive touchscreen display and displayed on the second end surface dynamically changes based on the user movement of the movable part associated with the tactile control.

2. The interactive control device according to claim 1, wherein the light guide is a collimated optical fiber.

3. The interactive control device according to claim 2, wherein the tactile control movable part is a rotary control configured to rotate the collimated optical fiber.

4. The interactive control device according to claim 1, wherein the movable part is one of an optical mouse sensor, a slider control, a push button and a rotary control.

5. The interactive control device according to claim 1, wherein the interactive touchscreen display is a LCD (liquid crystal display) panel.

6. The interactive control device according to claim 1, wherein the light guide is a flexible collimated optical fiber which is configured to remotely locate the second end surface away from the interactive touchscreen display and align the second end surface along a non-parallel plane relative to the interactive touchscreen display.

7. An interactive control system comprising:
an interactive touchscreen display system configured to display a control image associated with the control of a device, system or process;
a controller operatively connected to the interactive touchscreen display system; and
an interactive control device operatively connected to the interactive touchscreen display system, the interactive control device comprising:
a light guide including a first end surface, a second end surface, and a middle section optically coupling the first and second end surface and the light guide including an electrically conductive coating extending along a longitudinal axis of the light guide, the light guide configured to project on the second end surface a control image associated with the interactive touchscreen display optically coupled to the first end surface and electrically couple the light guide to the interactive touchscreen display; and
a tactile control operatively connected to the light guide, the tactile control configured to accept a user movement of a movable part associated with the tactile control, and provide an electrically conductive engagement of the light guide electrically conductive coating with the user movement of the movable part associated with the tactile control, the electrically conductive engagement operatively associated with movable touch control of the interactive touchscreen by the user movement of the movable part,
wherein the control image associated with the interactive touchscreen display and displayed on the second end surface dynamically changes based on the user movement of the movable part associated with the tactile control.

8. The interactive control system according to claim 7, wherein the light guide is a collimated optical fiber.

9. The interactive control system according to claim 7, wherein the tactile control movable part is a rotary control configured to rotate the collimated optical fiber.

10. The interactive control system according to claim 9, wherein the movable part is one of an optical mouse sensor, a slider control, a push button and a rotary control.

11. The interactive control system according to claim 7, wherein the interactive touchscreen display is a LCD (liquid crystal display) panel.

12. The interactive control system according to claim 7, wherein the light guide is a flexible collimated optical fiber which is configured to remotely locate the second end surface away from the interactive touchscreen display and align the second end surface along a non-parallel plane relative to the interactive touchscreen display.

13. An interactive control system comprising:
- an interactive touchscreen display system configured to display a plurality of control images associated with the control of a plurality of respective devices, systems or processes;
- a controller operatively connected to the interactive touchscreen display system;
- a plurality of control devices operatively connected to the interactive touchscreen display system, each interactive control device comprising:
  - a light guide including a first end surface, a second end surface, and a middle section optically coupling the first and second end surface and the light guide including an electrically conductive coating extending along a longitudinal axis of the light guide, the light guide configured to project on the second end surface a control image associated with the interactive touchscreen display optically coupled to the first end surface and electrically couple the light guide to the interactive touchscreen display; and
  - a tactile control operatively connected to the light guide, the tactile control configured to accept a user movement of a movable part associated with the tactile control, and provide an electrically conductive engagement of the light guide electrically conductive coating with the user movement of the movable part associated with the tactile control, the electrically conductive engagement operatively associated with movable touch control of the interactive touchscreen by the user movement of the movable part,
- wherein the control image associated with the interactive touchscreen display and displayed on the second end surface dynamically changes based on the user movement of the movable part associated with the tactile control; and
- a console configured to remotely locate the plurality of control devices, relative to the interactive touchscreen display system, wherein the second ends of the control devices are mounted to the console in two or more surface planes associated with the console.

14. The interactive control system according to claim 13, wherein the light guide is a collimated optical fiber.

15. The interactive control system according to claim 14, wherein the tactile control movable part is a rotary control configured to rotate the collimated optical fiber.

16. The interactive control system according to claim 13, wherein the movable part is one of an optical mouse sensor, a slider control, a push button and a rotary control.

17. The interactive control system according to claim 13, wherein the interactive touchscreen display is a LCD (liquid crystal display) panel.

18. The interactive control system according to claim 13, wherein the light guide is a flexible collimated optical fiber which is configured to remotely locate the second end surface away from the interactive touchscreen display and align the second end surface along a non-parallel plane relative to the interactive touchscreen display.

* * * * *